United States Patent
Wood

[19]

[11] Patent Number: 5,932,974
[45] Date of Patent: Aug. 3, 1999

[54] BALLAST CIRCUIT WITH LAMP REMOVAL PROTECTION AND SOFT STARTING

[75] Inventor: Peter N. Wood, Rolling Hills Estates, Calif.

[73] Assignee: International Rectifier Corporation, El Segundo, Calif.

[21] Appl. No.: 08/865,653

[22] Filed: May 30, 1997

Related U.S. Application Data

[60] Provisional application No. 60/018,986, Jun. 4, 1996, and provisional application No. 60/042,602, Apr. 2, 1997.

[51] Int. Cl.$^6$ .................................................. H05B 41/36
[52] U.S. Cl. ........................... 315/119; 315/106; 315/127
[58] Field of Search .................................. 315/119, 121, 315/127, 115, 116, 117, 105, 106, 107

[56] References Cited

U.S. PATENT DOCUMENTS

| | | | |
|---|---|---|---|
| 4,481,460 | 11/1984 | Kroning et al. | 315/208 X |
| 4,562,383 | 12/1985 | Kerscher et al. | 315/225 |
| 4,647,817 | 3/1987 | Fahnrich et al. | 315/105 X |
| 5,574,335 | 11/1996 | Sun | 315/119 |

*Primary Examiner*—Robert Pascal
*Assistant Examiner*—Justin P. Bettendorf
*Attorney, Agent, or Firm*—Ostrolenk, Faber, Gerb & Soffen, LLP

[57] ABSTRACT

A lamp ballast circuit drives at least one gas discharge illumination device and includes first and second MOS-gated power semiconductor devices connected in a half-bridge configuration and coupled across a d-c supply with a common terminal located at the node between the devices for supplying an output signal to the illumination device. A self-oscillating driver circuit includes respective outputs for driving the power semiconductor devices and has at least one operating voltage supply terminal. When the illumination device fails or is removed, a protection circuit, electrically coupled to the illumination device, removes the operating voltage supplied to the supply terminal. The protection circuit includes a transformer/inductor coupled to the illumination device or a switch that is responsive to the voltage across the illumination device. Additionally, a soft-starting circuit can be provided for gradually increasing the voltage across the illumination device prior to igniting the illumination device.

15 Claims, 5 Drawing Sheets

BALLAST CIRCUIT WITH LAMP REMOVAL PROTECTION AND SOFT STARTING

RELATED APPLICATIONS

This application claims the benefit of U.S. Provisional Application No. 60/018,986, filed Jun. 4, 1996, and of U.S. Provisional Application No. 60/042,602, filed Apr. 2, 1997.

This application is also related to U.S. Pat. No. 5,612,597, issued Mar. 18, 1997, entitled "OSCILLATING DRIVER CIRCUIT WITH POWER FACTOR CORRECTION, ELECTRONIC LAMP BALLAST EMPLOYING SAME AND DRIVER METHOD" (IR-1166), to U.S. Pat. No. 5,545,955, issued Aug. 13, 1996, entitled "MOS GATE DRIVER FOR BALLAST CIRCUITS" (IR-1074), to U.S. Pat. No. 5,559,394, issued Sep. 24, 1996, entitled "MOS GATE DRIVER FOR BALLAST CIRCUITS" (IR-1252), all of which are in the name of the present inventor, and to U.S. Pat. No. 5,550,436, issued Aug. 27, 1996, entitled "MOS GATE DRIVER INTEGRATED CIRCUIT FOR BALLAST CIRCUITS" (IR-1055), in the name of Talbott M. Houk. All of the above are assigned to the assignee of the present application.

BACKGROUND OF THE INVENTION

The present invention is directed to a lamp ballast circuit which includes a gate driver circuit for driving MOS gated devices and, more particularly, to a lamp ballast circuit which is protected against the removal of or failure of the lamp.

Electronic ballast circuits for driving fluorescent lamps or other gas discharge illumination devices are coming into widespread use because of the availability of power MOSFET switching devices to replace the previously used bipolar transistor devices. Typically, the electronic ballast circuit uses two power MOSFET switches in a totem pole (half-bridge) arrangement which includes one or more L-C series resonance circuits and in which the lamp or lamps are connected across one of the reactances of the L-C circuit. The power MOSFET switches are driven to conduct alternately by inputs from the secondary windings of a current transformer whose primary winding conducts the current of the lamp circuits. The primary winding current alternates at the resonance frequency of the resonant circuit.

Recently, integrated circuit MOS gate driver devices have been introduced in place of the current transformers. These integrated circuit devices drive the power MOSFETs or IGBTs of an inverter circuit in the ballast circuit from logic level ground referenced inputs and provide a self-oscillating function which is particularly suited for use in electronic lamp ballast circuits. The integrated circuit devices significantly save cost, weight and space when compared to driver circuits employing current transformers.

The MOS gate driver circuits have the drawback, however, that when the lamps are removed or are broken and create an open circuit, the power MOSFETs continue to switch in a hard switching mode with high power dissipation and fail due to overtemperature. It is therefore greatly desirable that the ballast circuit be able to shut down when there is an open circuit condition.

SUMMARY OF THE INVENTION

The present invention provides for an electronic lamp ballast circuit which, when a lamp is removed or fails, is shut down.

In accordance with an aspect of the present invention, the operating voltage is supplied to an MOS gate driver circuit by one or more secondary windings of a transformer/inductor having corresponding primary windings that are each in series with one of the lamps. When the lamps are removed or fail, resulting in an open load condition, current is interrupted to the primary side of the transformer/inductor, and, as a result, no current is delivered by the secondary windings which, in turn, reduces the operating voltage supplied to the MOS gate driver circuit to less than the undervoltage lockout voltage.

According to another aspect of the present invention, the lamps are coupled to the gate of a switch, such as a power MOSFET, whose source and drain are connected between the operating voltage input of the MOS gate driver circuit and the ground terminal. When the lamps are removed or fail, the switch is activated and clamps the operating voltage input to the ground terminal, hereby shutting off the gate driver circuit.

According to a further aspect of the invention, a soft-starting circuit gradually increases the voltage across the lamps prior to their ignition. A PTC thermistor or an L-C circuit gradually heats the lamps until the voltage across the lamps is sufficient for the lamps to strike.

Other objects, features and advantages of the present invention will be apparent from the detailed description below.

BRIEF DESCRIPTION OF THE DRAWINGS

The invention will now be described in greater detail in the following detailed description with reference to the drawings in which.

DETAILED DESCRIPTION OF THE INVENTION

Figure 1:
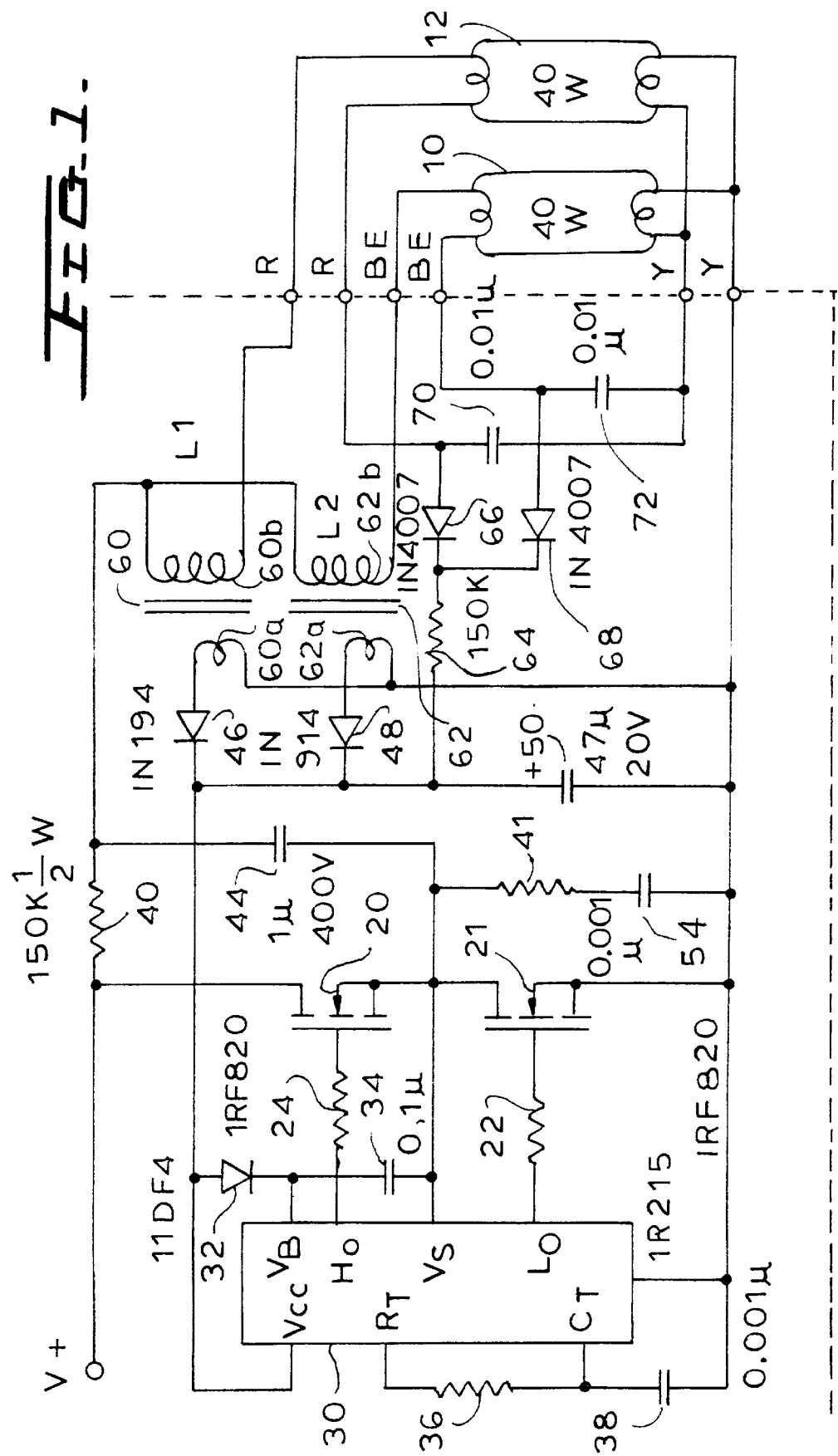
FIG. 1 is a schematic diagram showing an electronic ballast circuit with lamp removal protection according to an embodiment of the present invention.

FIG. 1 shows the novel ballast circuit according to an embodiment of the present invention. More specifically, the circuit of FIG. 1 includes a gas discharge lamp 10 associated with an L-C circuit formed of capacitors 44 and 72 and primary winding inductor 62*b* of transformer 62 and a second lamp 12 associated with an L-C circuit formed of capacitors 44 and 70 and primary winding inductor 60*b* of transformer 60. The circuit is typically connected to the lamps using a standard "double 40" fixture.

Two power MOSFETs 20 and 21 are connected to dc source terminals V+ in a totem-pole or half-bridge configuration. Power MOSFETs 20 and 21 may be any power device which has a MOS gate, for example, an IGBT or a MOS gated thyristor. The MOS gate driver chip 30 of FIG. 1 provides drive signals to the MOSFETs 20 and 21.

More specifically, the chip 30 may be housed in an 8-pin DIP or surface mount package, and has the following pinouts:

H$_O$—an output pin to the gate of the high side MOSFET 20.

L$_O$—an output pin to the gate of the low side MOSFET 21.

V$_S$—a pin to the center tap of the totem-pole or half-bridge connected MOSFETs 20 and 21.

G—a pin connected to the negative or ground terminal 23 of the d-c source.

C$_T$—a single input control pin which is connected to the node between timing capacitor 38 and timing resistor 36. The other side of capacitor 38 is connected to the negative or ground terminal. The signal at pin C$_T$ controls both outputs H$_O$ and L$_O$.

R$_T$—a pin which is connected to the other terminal of timing resistor 36.

V$_{CC}$—a pin which receives a chip operating voltage from the secondary windings 60*a* and 62*a*.

V$_B$—a pin connected to the node of diode 32 and capacitor 34, which acts as a "bootstrap" circuit to provide power for the operation of the high side switch.

In operation, and before tube 10 strikes, for example, the resonant circuit for this lamp consists of inductor 62*b* and both of capacitors 44 and 72. The capacitance of capacitor 72 is lower than that of capacitor 44 so that it operates at a higher a-c voltage than that of capacitor 44. This voltage on capacitor 72 strikes the lamp 10. After lamp 10 strikes, capacitor 72 is effectively shunted by the lamp voltage drop, and the frequency of the resonant lamp circuit now depends on inductor 62*b* and capacitor 44.

The shunting of capacitor 72 causes a shift to a lower resonant frequency during normal operation. The voltage of capacitor 72 is rectified by diode 68 and supplies current via resistor 64 to raise the supply voltage of chip 30 above the undervoltage lockout voltage to initiate oscillation. As noted above, the oscillation frequency of the circuit is synchronized by the resistor 36 and the capacitor 38.

Chip 30 also has interior circuitry to provide a dead time between outputs of the alternating high side and low side outputs for driving switches 20 and 21. This dead time could vary depending upon the particular application of the I.C. to: 1.) prevent cross-conduction currents from flowing in the power MOSFETs 20 and 21, and 2.) allow an external "snubber" circuit, such as resistor 41 and capacitor 54, to control the half-bridge output voltage slew rate in order to reduce radiated EMI noise.

Also, the chip 30 may be supplied at terminal V$_{CC}$ with a rectified a-c voltage. The voltage supplied at terminal V+ can range from 225 volts d-c to about 450 volts d-c, depending upon the supplied AC input voltage or the supplied PFC output voltage. The inductance values of inductors 60*b* and 62*b* will depend on the value of voltage V+ and are selected so that the oscillation frequency of the circuit ranges from approximately 30 kHZ to about 45 kHZ.

The ballast circuit of this embodiment of the present invention is capable of operating with either one lamp or two lamps inserted in the fixture. Alternatively, the circuit may be configured to operate with one, two or more lamps by providing additional lamp circuits that are each connected to a respective capacitor, transformer and diodes arranged in parallel with and having values similar to that of diodes 66 and 68, capacitors 70 and 72, transformers 60 and 62 and diodes 46 and 48 of lamps 10 and 12, respectively.

The novel protection feature of the present invention operates as follows:

When both of the two lamps 10 and 12 are removed or fail, the two current paths that include lamps 10 and 12, respectively, and primary windings 60*b* and 62*b* of transformers 60 and 62, respectively, are interrupted so that no current flows through the primary windings 60*b* and 62*b*. As a result, the current flow through the secondary windings 60*a* and 62*a* of transformers 60 and 62 is interrupted, and reduced operating voltage is supplied to inputs V$_{CC}$ and V$_B$ of the MOS gate driver chip 30. The gate driver chip 30 therefore does not supply voltage or current to outputs H$_O$ and L$_O$ so that the power MOSFETs 20 and 21 are turned off and do not supply power to the lamps 10 and 12. It should be noted that because V$_{CC}$ is generally lowered below the undervoltage lockout voltage, the circuit does not "hiccup" when both lamps fail or are removed.

When at least one of lamps 10 or 20 is subsequently inserted in the fixture, the current path that includes its primary winding 60*b* or 62*b* of transformer 60 or 62 is closed so that an operating voltage is supplied by the corresponding secondary winding 60*a* or 62*a* to inputs V$_{CC}$ and V$_B$. The gate driver chip 30 is then activated which, in turn, activates the lamp.

Figure 2:
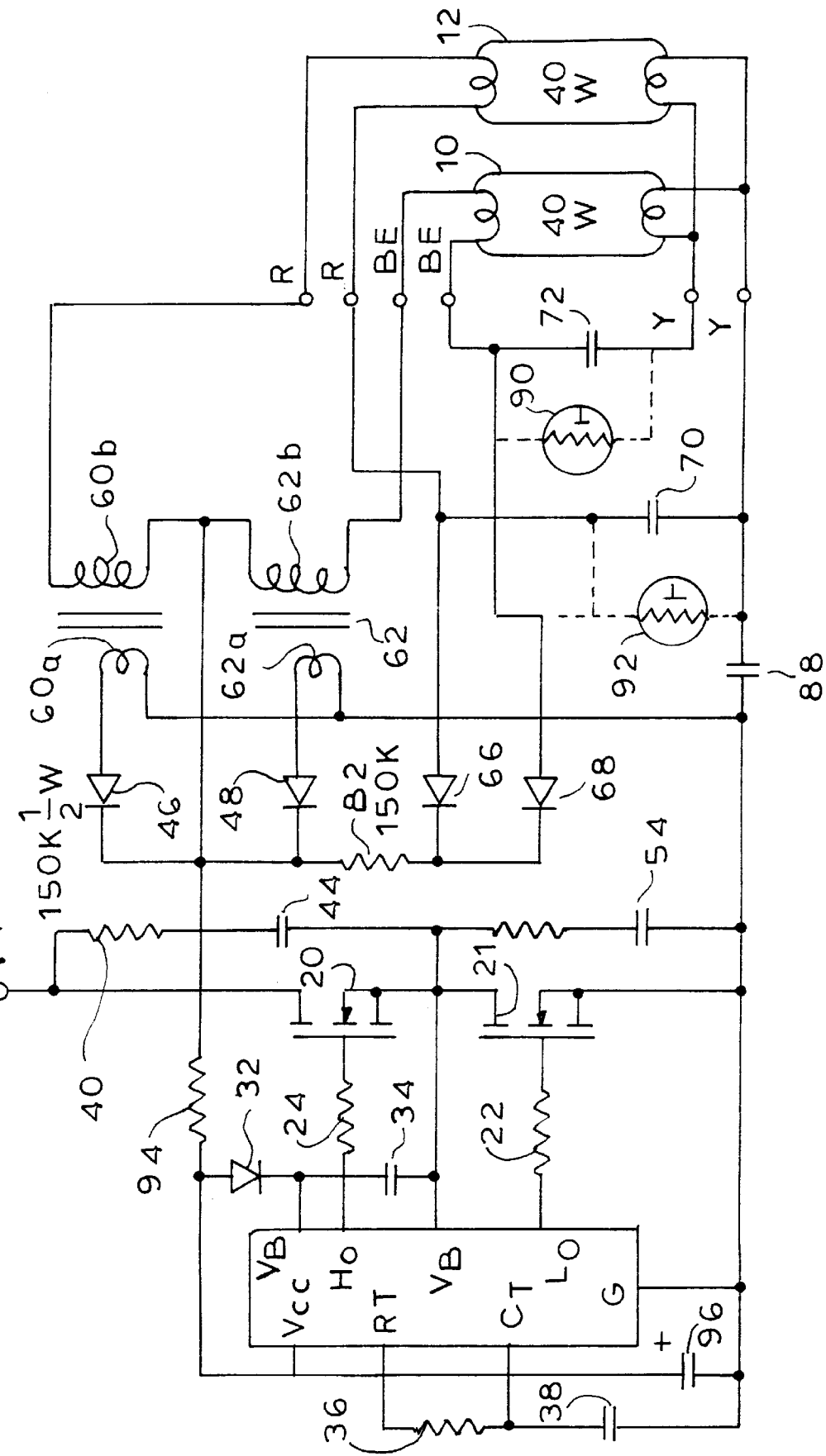
FIG. 2 is a schematic diagram showing an electronic ballast circuit with lamp removal protection according to another embodiment of the present invention.

FIG. 2 illustrates another embodiment according to the present invention in which PTC thermistors 90 and 92 are used to preheat the lamps 10 and 12. The elements shown in FIG. 2 that have the same reference numerals as are shown in FIG. 1 are identical to the corresponding elements shown in FIG. 1.

The lamp circuit in FIG. 2 likewise employs two 40 watt fluorescent lamps 10 and 12 in a common reflector which have respective series inductors 62*a* and 60*a* and series capacitor 44. Each of tubes 10 and 12 have parallel capacitors 70 and 72, respectively, and parallel positive temperature coefficient thermistors 90 and 92, respectively.

Soft-starting with tube filament pre-heating is accomplished by the P.T.C. thermistors 90 and 92 across each lamp. In this way, the voltage across the lamp gradually increases as the P.T.C. thermistor self-heats until finally the striking voltage with hot filaments is reached and the lamp strikes.

The circuit shown in FIG. 2 also includes the novel lamp protection feature shown in FIG. 1.

Figure 3:
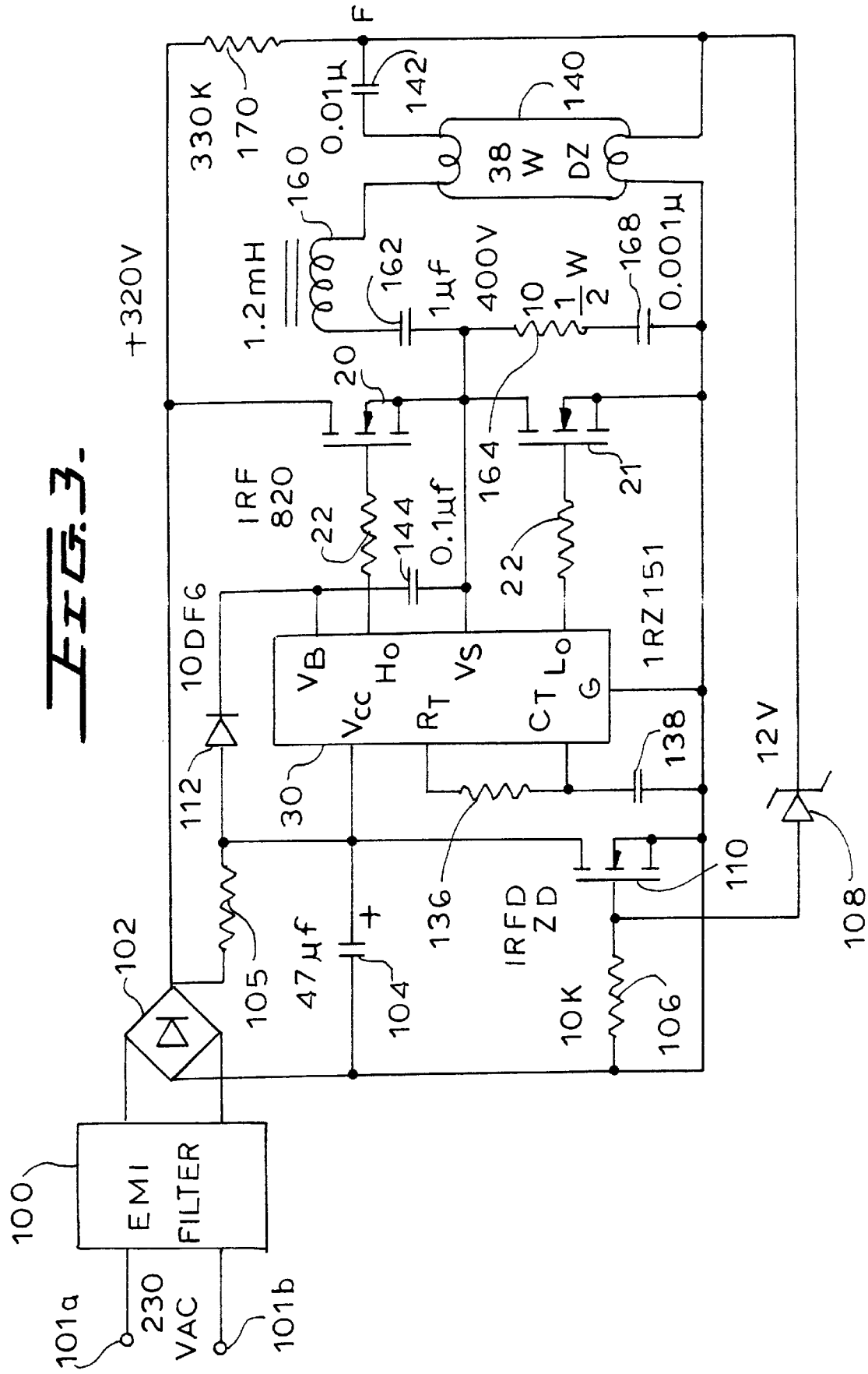
FIG. 3 is a schematic diagram showing an electronic ballast circuit with lamp removal protection according to still another embodiment of the present invention.

FIG. 3 illustrates yet another embodiment of the present invention which includes an alternative implementation of the novel protection feature of the present invention.

FIG. 3 shows a ballast circuit in which the input a-c circuit includes a 230 volt a-c source having two a-c terminals 101*a* and 101*b* and which supplies power to an EMI filter circuit 100. The filter circuit supplies power to a single phase full wave rectifier 102 having a positive output connected to resistor 105 and a negative terminal connected to capacitor 104 and which provides a 320 volt d-c output from the 230 volt a-c input.

The MOS gate driver chip 30 of FIG. 3 operates directly off the d-c bus through the dropping resistor 105 and oscillates in compliance with the following relationship:

$$f_{OSC} = \frac{1}{1.4 R_{136} C_{138}}$$

where R$_{136}$ is the resistance of resistor 136 and C$_{138}$ is the capacitance of capacitor 138.

Power for the high side switch gate drive comes from bootstrap capacitor 144 which is generally much larger than the MOSFET input capacitance and is charged to approximately 14 volts whenever pin V$_S$ is pulled low during the low side power switch conduction. The bootstrap diode 112 blocks the d-c bus voltage when the high side switch conducts. Diode 112 is a fast recovery diode to ensure that the bootstrap capacitor 144 is not partially discharged as the diode 112 recovers and blocks the high voltage bus.

The high frequency output from the half-bridge MOSFETs 20 and 21 would ordinarily be a square wave with very fast transition times. In order to avoid excessive radiated noise from the fast wave fronts, a snubber resistor 164 and a snubber capacitor 168 are used to slow down the switch times. Also present is a built-in dead time to prevent shoot-through currents in the half-bridge.

Though only one fluorescent lamp 140 is shown, additional fluorescent lamps may be incorporated in parallel with lamp 140, each with its own L-C resonant circuit. Any number of tube circuits can thus be driven from the single pair of power MOSFETs 20 and 21 if the power MOSFETs are sized accordingly to suit the resulting power level.

The d-c bus also supplies power to the lamp failure protection arrangement of FIG. 3 which is comprised of a MOSFET 110 whose gate is coupled to a voltage divider formed by resistor 170, zener diode 108 and resistor 106 and having a source and drain that are connected across the $V_{CC}$ pin and the G pin of chip 30.

According to this embodiment, when the lamp 140 is removed or fails, the voltage across the voltage divider rises and activates MOSFET 110 which clamps the $V_{CC}$ input to ground, thereby turning off the MOS gate driver chip 30 and cutting off the oscillating output supplied to the lamp 140. Alternatively, another type of MOS-gated device may be substituted for MOSFET 110.

When the lamp 140 is replaced, the voltage across the voltage divider falls and turns off MOSFET 110. As a result, the operating voltage supplied to input $V_{CC}$ is reestablished so that chip 30 activates and again supplies power to MOSFETs 20 and 21 to ignite the lamp 140.

Figure 4:
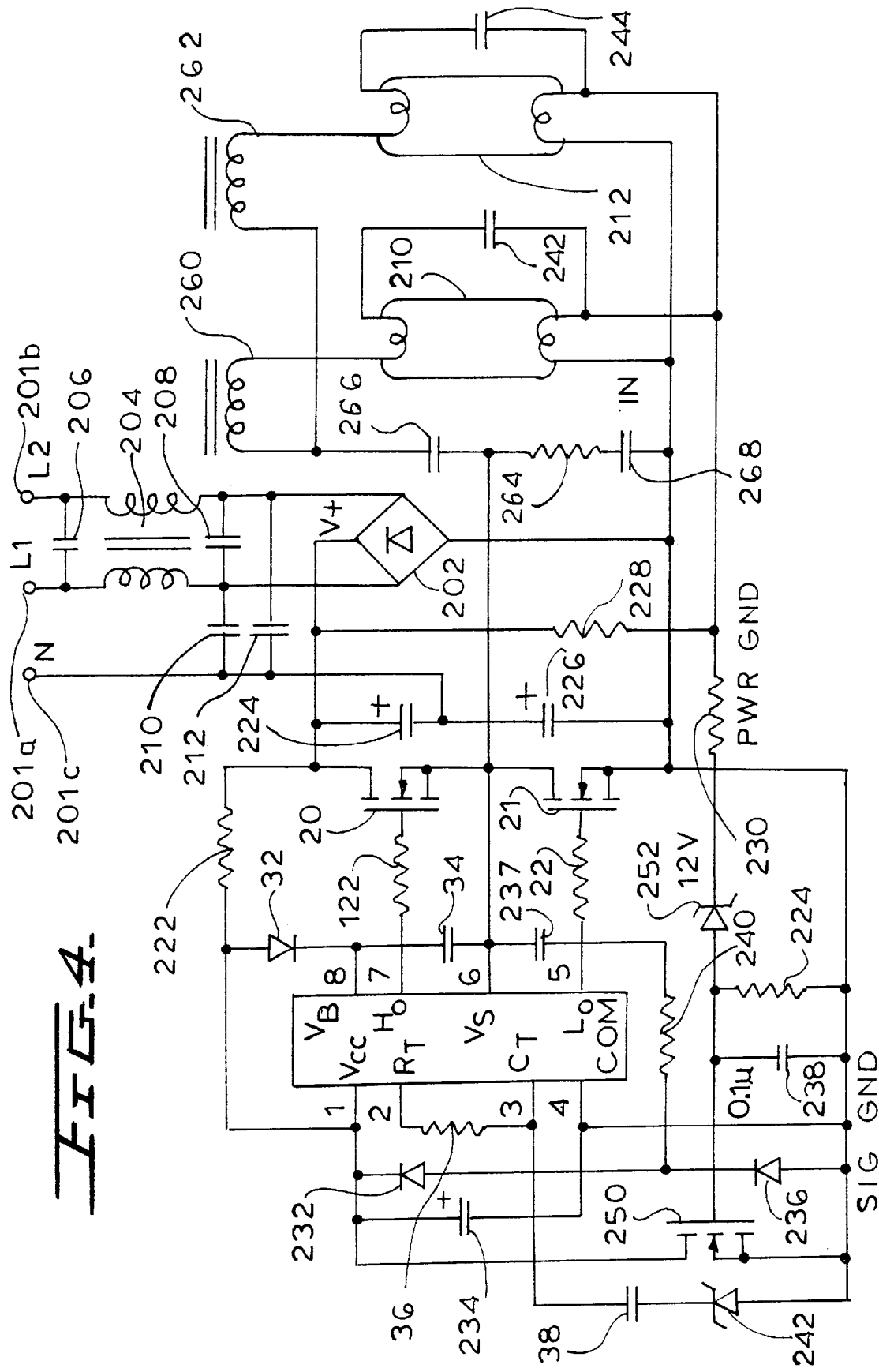
FIG. 4 is a schematic diagram showing a further embodiment of an electronic lamp ballast circuit with lamp removal protection according to the invention.

FIG. 4 shows a ballast circuit which provides soft starting of two lamp ballast circuits and which also includes the novel lamp removal protection feature of the invention. Typically, the lamps are 32 W lamps.

Before lamp 210 strikes, for example, the resonant circuit for the lamp comprises inductor 260 and capacitor 266, which are arranged in series with the lamp, as well as capacitor 242 which are arranged in parallel with the lamp. Similarly, the resonant circuit for lamp 212 includes inductor 260, capacitor 266 and capacitor 244. The ballast operating frequency is always above the resonance value.

Initially, during pre-heat, the voltage across the lamps is too low for ignition. As the frequency drops, the lamp voltage increase until ignition occurs. At the same time, capacitor 234, which for example is a 220 microfarad capacitor and is arranged between the $V_{CC}$ and the COM terminals of the IC 30, charges from two current sources. The first current source is supplied at the terminal V+ by the diode bridge 202 and delivered through dropping resistor 222, which may be a 150 K-ohm resistor. The second current source is supplied by the ac output of the half-bridge MOSFETs 21 and 22 and delivered through a capacitor 237, which may be a 0.01 microfarad capacitor, that is arranged in series with a resistor 240, which is typically a 10 K-ohm resistor.

As the capacitor 234 charges, $V_{CC}$ rises and reduces the output frequency of the half-bridge MOSFETS. This reduction in output frequency reduces the inductive reactance $X_L$ and raises the capacitive reactance $X_C$ so that the lamp voltage, which is dependent upon the ratio of $X_L$ and $X_C$, rises with time until ignition occurs. The time required to pre-heat the lamp is thus a function of the charging time of capacitor 234.

When one of the lamps 210 and 212 is removed or fails, the lamp circuit continues to operate. When both of the lamps 210 and 212 are removed or fail, the voltage across the voltage divider formed by resistor 230 and zener diode 252 increases and turns on MOSFET 250, thereby grounding the voltage $V_{CC}$ that is supplied to the input of the MOS gate driver chip 30. As a result, the gate voltages supplied to the gates of the half-bridge MOSFETs 20 and 21 fall and cut off the power supplied to the lamps. When one of the lamps is then replaced, the circuit will re-initiate the above-described soft start operation.

Figure 5:
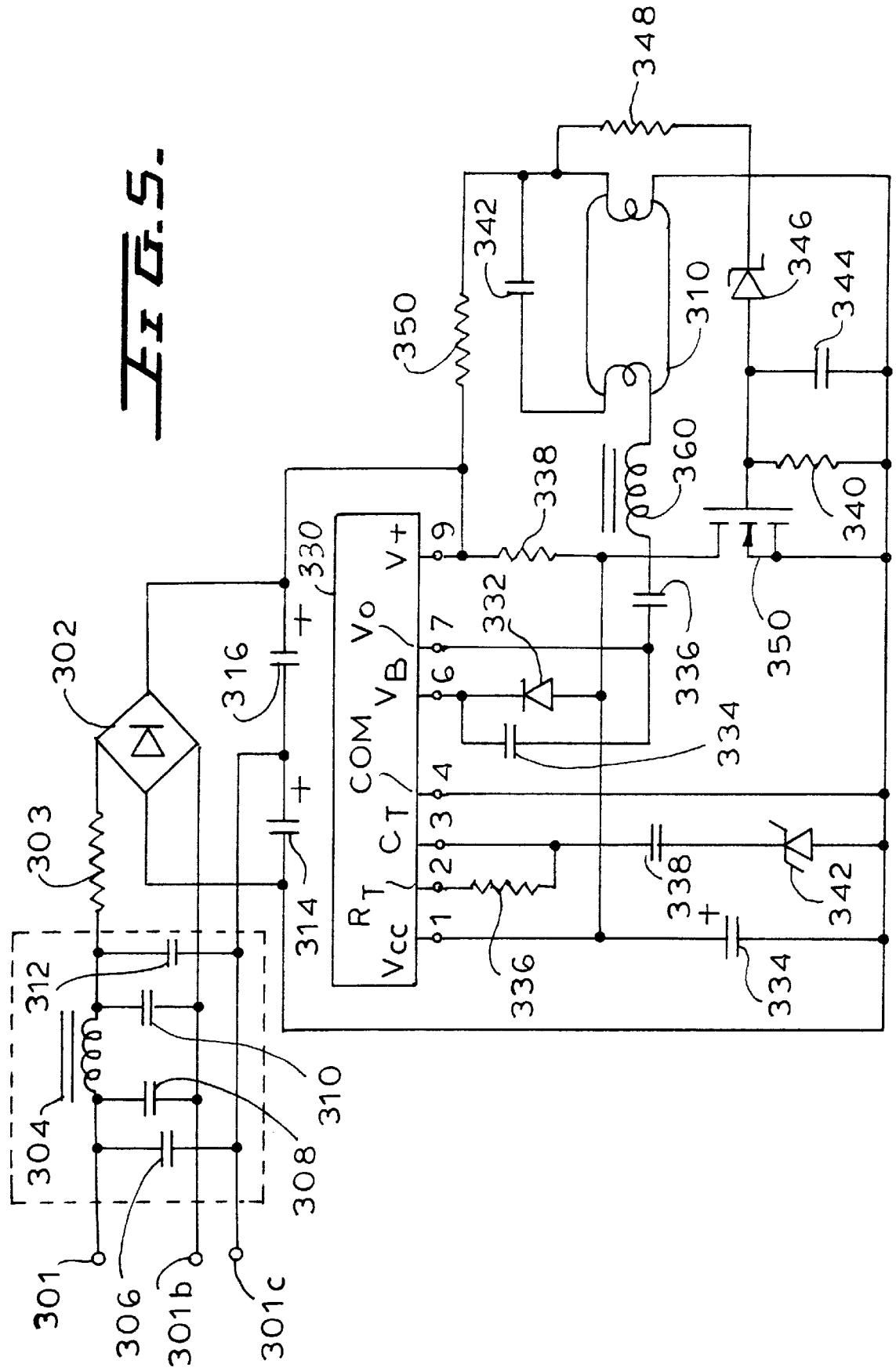
FIG. 5 shows a schematic diagram of a still further embodiment of an electronic ballast circuit with lamp removal protection according to the invention.

FIG. 5 shows another example of a ballast circuit which incorporates another implementation of the soft starting and lamp removal protection features. Here, a compact fluorescent ballast circuit supplies power to a single lamp 310, which may be a 13 W to 26 W lamp. A driver IC 330, which for example is an International Rectifier IR51H420 integrated circuit that is suitable for a compact ballast circuit, incorporates the half-bridge connected MOSFETs that supply an ac output to the lamp at terminal V+. The remaining terminals of the IC operate in the same manner as the terminals having the same labels in the IC of the above embodiments.

In this embodiment, the soft starting feature is provided by the resonant circuit that is formed by inductor 360 and capacitors 336 and 342 and that initially oscillates at a frequency higher than the operating frequency. The ratio of the L-C circuit elements causes pre-heating and ignition of the lamp 310 in the manner described above. Capacitor 334, which is arranged between the $V_{CC}$ and the COM terminals of the IC 330, is charged in a similar manner to that described in the circuit of FIG. 4 by current supplied by terminal V+ and diode bridge 302. The current is delivered through resistor 338 and causes $V_{CC}$ to rise until the lamp 310 ignites.

When lamp 310 is removed, the voltage supplied to the gate of MOSFET 350 by the voltage divider formed by resistor 348, zener diode 346 and resistor 340 rises and activates the MOSFET. Thus, input voltage $V_{CC}$ is reduced to ground level and turns off driver integrated circuit 330 to protect the ballast circuit.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A circuit for driving at least one gas discharge illumination device, said circuit comprising:

first and second MOS-gated power semiconductor devices connected in a half bridge configuration coupled across a dc supply and having a common terminal at the node between said first and second MOS gated power semiconductor devices for supplying an output signal to the illumination device;

a self oscillating driver integrated circuit having first and second outputs for driving said first and second MOS gated power semiconductor devices, respectively, and having at least one operating voltage supply terminal; and a protection circuit electrically coupled to said illumination device for removing an operating voltage supplied to said supply terminal to turn off said driver integrated circuit when said illumination device fails or is removed.

2. The device of claim 1 wherein said protection circuit comprises a transformer/inductor having a primary winding coupled between said dc supply and said illumination device and having a secondary winding coupled between said supply terminal of said driver circuit and said common terminal.

3. The device of claim 2 further comprising a soft-starting circuit for gradually increasing the voltage across said illumination device prior to igniting said illumination device.

4. The device of claim 3 wherein said soft-starting circuit includes a PTC thermistor.

5. The device of claim 1 wherein said protection circuit comprises a switch coupled between said supply terminal of said driver circuit and said common terminal and that is responsive to the voltage across said illumination device.

6. The circuit of claim 5 wherein said switch comprises a MOS-gated device having source and drain terminals coupled between said supply terminal of said driver circuit and said common terminal and having a gate terminal that is responsive to said voltage across said illumination device such that when said illumination device is removed or fails, the voltage at said gate terminal rises and turns on said MOS-gated device.

7. The circuit of claim 6 wherein said MOS-gated device comprises a MOSFET.

8. The circuit of claim 5 wherein said protection circuit includes a voltage divider coupled between said illumination device and said common terminal for supplying a divided voltage to said switch.

9. The circuit of claim 5 further comprising a soft-starting circuit for gradually increasing the voltage across said illumination device prior to igniting said illumination device.

10. The circuit of claim 9 wherein said soft-starting circuit includes a series L-C circuit coupled between said illumination device and said common terminal, the voltage across said L-C circuit oscillating prior to ignition of said illumination device.

11. A method of protecting a circuit for driving at least one gas discharge illumination device, said method comprising the steps of:

arranging first and second MOS-gated power semiconductor devices connected in a half bridge configuration coupled across a dc supply and having a common terminal at the node between said first and second MOS gated power semiconductor devices for supplying an output signal to the illumination device;

providing a self oscillating driver integrated circuit having first and second outputs for driving said first and second MOS gated power semiconductor devices, respectively, and having at least one operating voltage supply terminal; and sensing a voltage across said illumination device and removing an operating voltage supplied to said driver at least one supply terminal to turn off said driver integrated circuit when said illumination device fails or is removed.

12. The method of claim 11 wherein said operating voltage is removed by a transformer having a primary winding coupled between said dc supply and said illumination device and having a secondary winding coupled between said supply terminal of said driver circuit and the common terminal.

13. The method of claim 11 wherein said operating voltage is removed by a switch coupled between said supply terminal of said driver circuit and said common terminal and that is responsive to the voltage across said illumination device.

14. The method of claim 13 wherein said switch comprises a MOS-gated device having source and drain terminals coupled between said supply terminal of said driver circuit and said common terminal and having a gate terminal coupled to a voltage across said illumination device such that when said illumination device is removed or fails, the voltage at said gate terminal rises and turns on said MOS-gated device.

15. The method of claim 14 wherein MOS-gated device is a MOSFET.

* * * * *